United States Patent [19]

Itakura et al.

[11] 4,143,207
[45] Mar. 6, 1979

[54] SEMICONDUCTIVE CERAMICS

[75] Inventors: Gen Itakura, Amagasaki; Takashi Iguchi, Katano, both of Japan

[73] Assignee: Matsushita Electric Industrial Co., Ltd., Osaka, Japan

[21] Appl. No.: 759,807

[22] Filed: Jan. 17, 1977

[30] Foreign Application Priority Data

| Jan. 20, 1976 | [JP] | Japan | 51-5648 |
| Jan. 28, 1976 | [JP] | Japan | 51-8730 |
| Feb. 13, 1976 | [JP] | Japan | 51-15016 |
| Feb. 13, 1976 | [JP] | Japan | 51-15017 |
| Mar. 16, 1976 | [JP] | Japan | 51-28728 |
| Mar. 16, 1976 | [JP] | Japan | 51-28729 |
| Mar. 16, 1976 | [JP] | Japan | 51-28730 |
| Apr. 10, 1976 | [JP] | Japan | 51-40553 |

[51] Int. Cl.$^2$ .................. H01B 1/08; C04B 35/46; C04B 35/50; H01L 21/38
[52] U.S. Cl. ................. 428/539; 106/73.2; 106/73.3; 252/62.3 BT; 252/62.3 R; 252/520; 252/521; 428/432; 428/913
[58] Field of Search ......... 252/62.3 BT, 62.3 R, 252/520, 521, 518; 428/538, 539, 913, 426, 432; 106/73.3, 73.2

[56] References Cited

U.S. PATENT DOCUMENTS

| 3,069,276 | 12/1962 | Domanski | 106/73.3 |
| 3,074,804 | 1/1963 | Planer et al. | 252/62.3 BT |
| 3,294,688 | 12/1966 | Precht | 252/62.3 BT |
| 3,427,173 | 2/1969 | Fujiwara et al. | 106/73.2 |
| 3,673,119 | 6/1972 | Ueoka et al. | 252/62.3 BT |
| 3,764,529 | 10/1973 | Matsuo et al. | 252/62.3 BT |
| 4,014,822 | 3/1977 | Fujikawa | 252/62.3 BT |
| 4,022,716 | 5/1977 | Ueoka et al. | 252/520 |
| 4,058,404 | 11/1977 | Fujiwara et al. | 106/73.2 X |
| 4,061,583 | 12/1977 | Murata et al. | 252/520 X |
| 4,073,846 | 2/1978 | Masumura et al. | 106/73.3 X |

Primary Examiner—Harold Ansher
Attorney, Agent, or Firm—Stevens, Davis, Miller & Mosher

[57] ABSTRACT

A composition consisting of 5 to 95 mol% of bismuth oxide ($Bi_2O_3$) and 95 to 5 mol% of copper oxide ($Cu_2O$), or a composition consisting of 50 to 95 mol% of copper oxide ($Cu_2O$) and 50 to 5 mol% of manganese dioxide ($MnO_2$), or a composition consisting of 5 to 95 mol% of bismuth oxide ($Bi_2O_3$) and 95 to 5 mol% of manganese dioxide ($MnO_2$), is thermally diffused in the grain boundaries of semiconductor ceramics composed mainly of strontium titanate ($SrTiO_3$) to form highly insulating layers in the grain boundaries to thereby provide semiconductive ceramics wherein the rate of change of dielectric constant with temperature as well as the dielectric loss (tan δ) are smaller than in the conventional barium titanate type semiconductor products. Further, the insulation resistance is higher than in the conventional product.

11 Claims, 33 Drawing Figures

FIG. I(A)
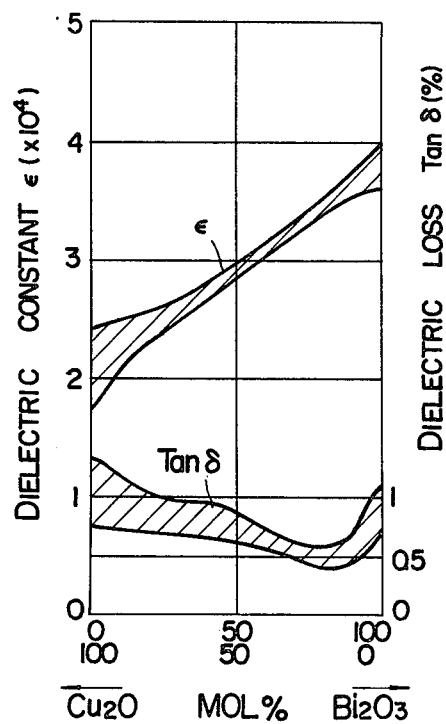
FIG. I(B)
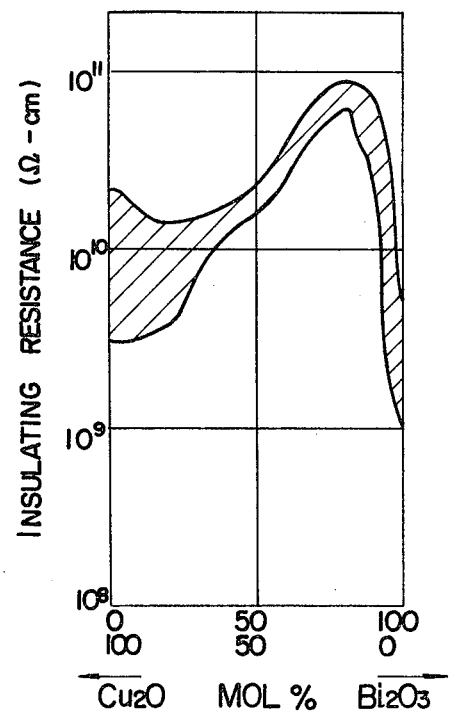

FIG. 7(A)
FIG. 7(B)
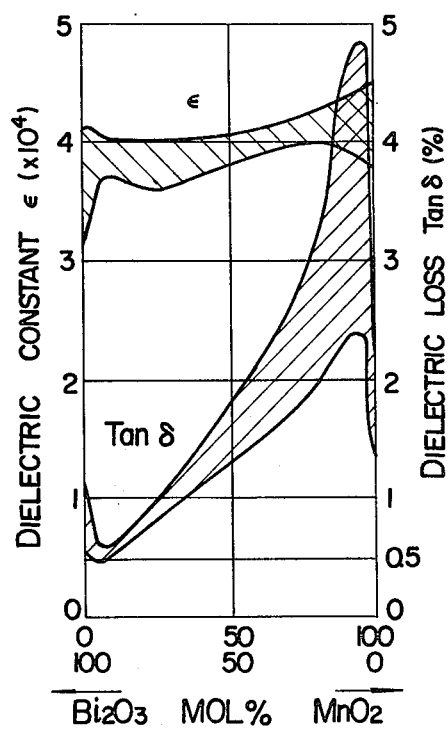
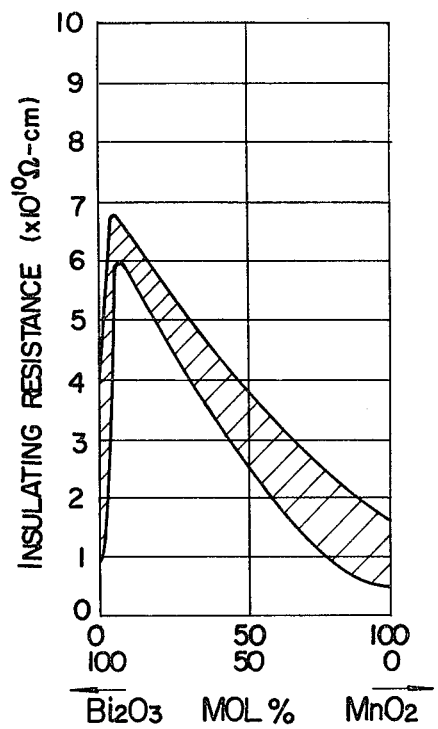

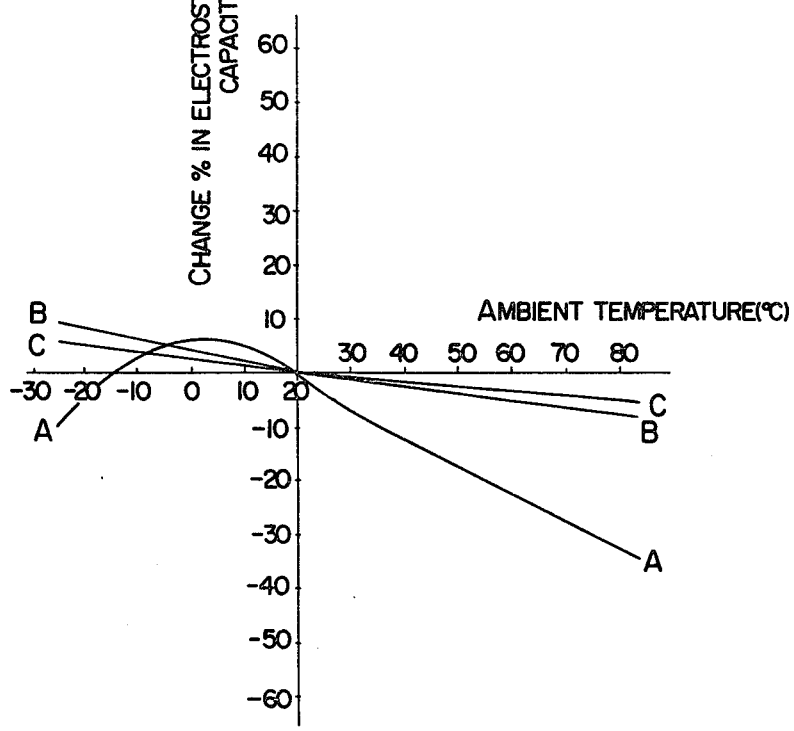
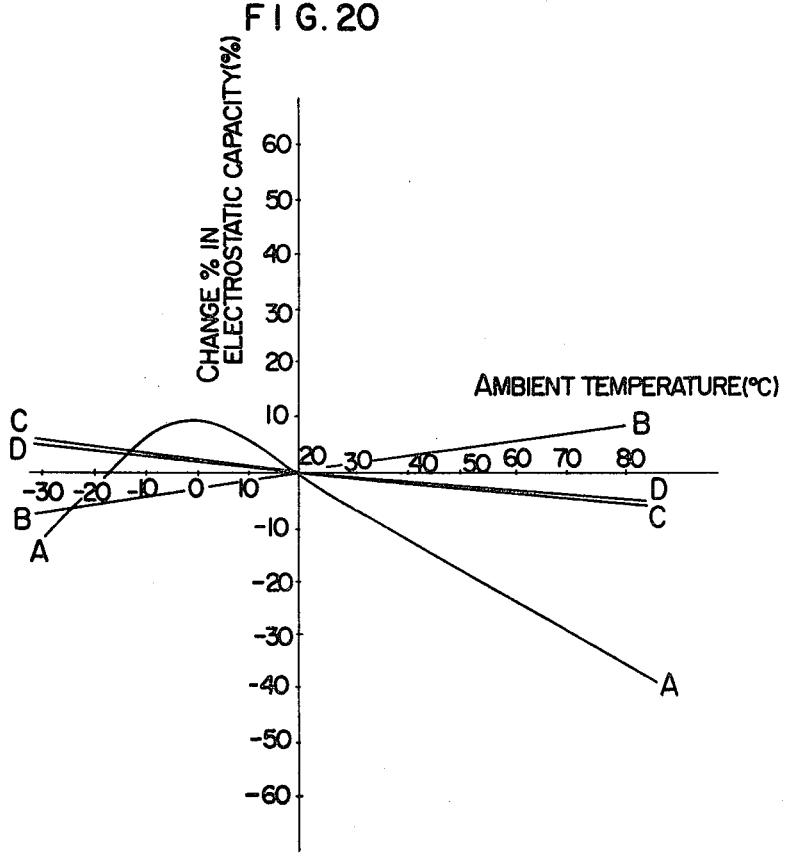

SEMICONDUCTIVE CERAMICS

This invention relates to improved semiconductive ceramics obtained by forming highly insulating layers in the grain boundaries in semiconductive ceramics composed primarily of strontium titanate ($SrTiO_3$).

Barium titanate type ceramic semiconductors are known as electric capacitor materials and are obtained by insulating the grain boundaries of the ceramic semiconductors. Such barium titanate type ceramic semiconductors can provide high insulating resistance on the order of $10^{11} \Omega$-cm an extremely high effective dielectric constant amounting to as much as 50,000 to 70,000. However, these semiconductors have the drawbacks that the electrostatic capacity in the temperature range of from $-30°$ C. to $+85°$ C. could vary over the range of about $\pm 40\%$, and that the dielectric loss (tan $\delta$) they suffer could amount to about 5 to 10%.

Efforts for overcoming such problems have resulted in recent development of a semiconductive ceramic capacitor which is composed primarily of strontium titanate and wherein the rate of change of electrostatic capacity with temperature is minimized. Such a semiconductive ceramic capacitor composed primarily of strontium titanate ($SrTiO_3$) has incipiently been manufactured by first making a semiconductive ceramic by adding small quantities of maganese dioxide ($MnO_2$), silicon oxide ($SiO_2$) or the like to strontium titanate ($SrTiO_3$), sintering the mixture in a reducing atmosphere and then subjecting such semiconductive ceramic merely to a heat treatment to re-oxidize the grain boundaries, or thermally diffusing manganese dioxide ($MnO_2$), bismuth oxide or the like in the grain boundaries. Such semiconductive ceramic capacitor as compared with the barium titanate type products, is characterized by a reduced rate of change of effective dielectric constant and a minimized amount of dielectric loss (tan $\delta$). The former, however has a disadvantage in that the effective dielectric constant is excessively low as compared with the barium titanate type products. In order to improve such effective dielectric constant, the addition of certain types of impurities to strontium titanate ($SrTiO_3$) has been proposed. For instance, the addition of zinc oxide (ZnO), rare earth oxides and the like either singly or in combination, in addition to the materials necessary for formation of the semiconductor, such as tantalum oxide ($Ta_2O_5$), niobium oxide ($Nb_2O_5$), tungsten oxide ($WO_3$) and the like, has provided semiconductor in capacitors with an effective dielectric constant on the order of 40,000 to 50,000 and dielectric loss of less than 1%.

Such small-sized high-performance elements involve the problems resulting from their high-performance characteristic. One of such problems is that the element characteristics are greatly influenced by the scatter in the amounts of the materials diffused in the ceramics, making the process control extremely difficult. Efforts are being also made for improvement of the electric properties, but as regards lessening of variations of the dielectric constant with change of ambient temperature, although a certain improvement has been made in this respect over the barium titanate type products, no satisfactory results have yet been attained.

The object of the present invention is to provide semiconductive ceramics with minimized variations in characteristics and a greatly reduced rate of change of dielectric constant with temperature.

This object can be accomplished by diffusing insulating layer material in the grain boundaries in the semiconductive ceramics necessary for forming the semiconductor. This achievement is of great industrial significance.

The foregoing and other objects and advantages of the invention will be made more apparent as the specification proceeds.

FIGS. 1, 2, 4, 5, 7, 8, 10, 11, 13, 14, 16 and 17 show dielectric constant, dielectric loss and insulating resistance of the present semiconductive ceramics of various proportions in the insulating layers.

FIGS. 19 and 20 show the rates of change of electrostatic capacity with temperature in the various products.

Figure 2A:
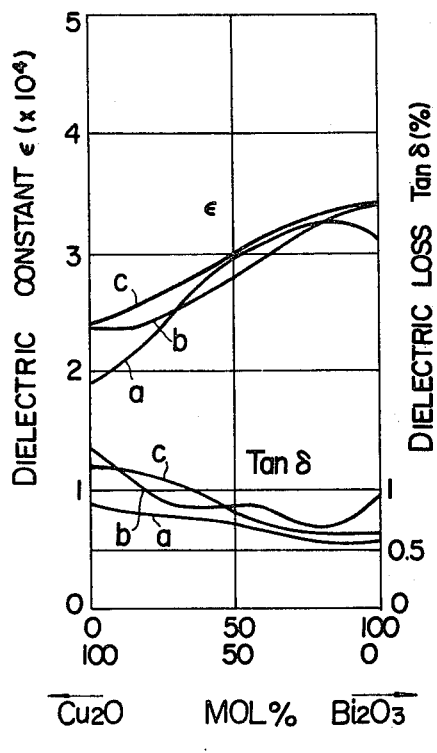

This invention will be explained now with reference to examples shown in this disclosure.

Semiconductive ceramics comprising at least two of the following materials selected from the group consisting of copper oxide ($Cu_2O$), bismuth oxide ($Bi_2O_3$), manganese dioxide ($MnO_2$) and lithium carbonate ($Li_2CO_3$), is thermally diffused as an insulating layer in the grain boundaries in a polycrystalline ceramic semiconductor mainly composed of strontium titanate ($SrTiO_3$) with small amounts of niobium oxide ($Nb_2O_5$) or tantalum oxide ($Ta_2O_5$) or bismuth oxide ($Bi_2O_3$) so that the insulating layers are provided in the grain boundaries.

The present invention is a successful outcome of many studies and experiments on this subject, and it provides semiconductive ceramics which are very limited in scatter of the product properties in the aforesaid diffusing step and wherein the change of dielectric constant with temperature is minimized.

The present invention is now described in detail by way of embodying examples of the invention.

EXAMPLE 1

Strontium titanate ($SrTiO_3$) is added to niobium oxide ($Nb_2O_5$) in an amount of 0.1 to 2.0 mol%, and after sufficient mixing, the mixture is pressure molded into a disc having a size of 15 mm in diameter and 0.7 mm in thickness. This disc is then sintered in an atmosphere consisting of 1 to 10% hydrogen and 99 to 90% nitrogen at a temperature within the range of 1370° to 1460° C. for 2 to 4 hours, and then a mixture of diffusion materials is applied to one side of the sintered disc by using a suitable known binder (such as for example polyvinyl alcohol), followed by a heat treatment at 1050° to 1200° C. for about 2 hours. A silver electrode is provided on both sides of the thus obtained sintered mass.

Table 1 shows the mean values of the electrical properties of 20 samples of the disc-shaped products obtained by applying and diffusing mixtures of bismuth oxide ($Bi_2O_3$) and copper oxide ($Cu_2O$) of various proportions in the sintered mass.

Table 1

| Diffused materials (mol ratio) | | Effective dielectric constant $\epsilon$ | Dielectric loss tan $\delta$ (%) | Insulating resistance ($\Omega$-cm) |
|---|---|---|---|---|
| $Cu_2O$ | $Bi_2O_3$ | | | |
| 1.0 | 0 | 19573 | 1.20 | $5.1 \times 10^9$ |
| 0.95 | 0.05 | 24150 | 0.86 | $4.2 \times 10^9$ |

Table 1-continued

| Diffused materials (mol ratio) | | Effective dielectric constant $\epsilon$ | Dielectric loss tan $\delta$ (%) | Insulating resistance ($\Omega$-cm) |
|---|---|---|---|---|
| $Cu_2O$ | $Bi_2O_3$ | | | |
| 0.80 | 0.20 | 25231 | 0.81 | $5.6 \times 10^9$ |
| 0.50 | 0.50 | 29617 | 0.70 | $1.2 \times 10^{10}$ |
| 0.20 | 0.80 | 33018 | 0.41 | $7.6 \times 10^{10}$ |
| 0.05 | 0.95 | 34620 | 0.56 | $3.8 \times 10^{10}$ |
| 0 | 1.0 | 37010 | 0.93 | $1.6 \times 10^9$ |

FIGS. 1(A) and 1(B) are diagrammatical representations of the properties of these samples. The characteristic values of all of the samples are embraced within the hatched areas in the drawings. The curve defining the upper limit of each hatched area indicates the maximum values of the samples and the curve defining the lower limit of each area indicates the minimum values of the samples.

Figure 2B:
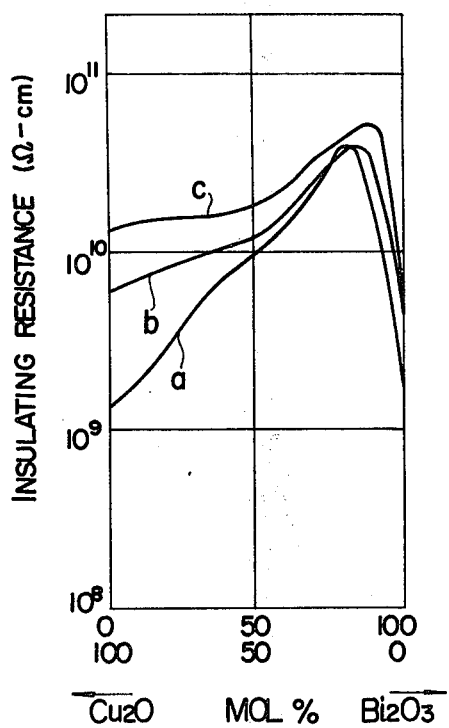

As apparent from these tables and drawings, there are observed not only greater improvement of various properties of the samples but also more limited variance of such properties when both copper oxide ($Cu_2O$) and bismuth oxide ($Bi_2O_3$) are used in combination for diffusion than when such material is used singly. FIGS. 2(A) and (B) are diagrammatic representations of the property values as obtained when applying the diffusion materials at the rates of 0.3 mg/cm$^2$, 0.5 mg/cm$^2$ and 1.0 mg/cm$^2$, respectively. In these drawings, curves a, b and c are characteristic curves corresponding to the respective rates of application. It is noted from these drawings that the influence of the application rate to be obtained properties is smaller when using copper oxide ($Cu_2O$) and bismuth oxide ($Bi_2O_3$) in combination than when using such material singly. It is also evident from FIG. 2 that variance of properties seen in FIG. 1 is attributable to the difference in application rate.

Figure 3:
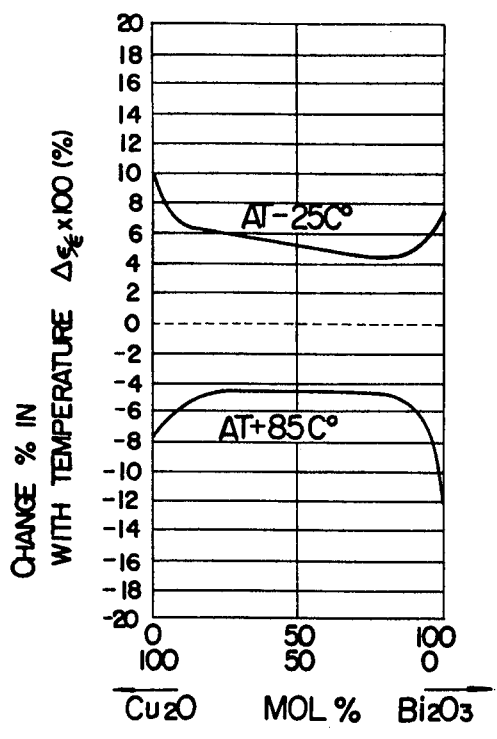
FIGS. 3, 6, 9, 12, 15 and 18 show the change (%) in dielectric constant with temperature of the present semiconductive ceramics of various proportions in the insulating layers.

FIG. 3 shows the rates of change of dielectric constant at $-25°$ C. and $+85°$ C. (with the value at 20° C. being given as reference (0)). It is appreciated from this drawing that temperature dependency of the dielectric constant is markedly low when the proportions of copper oxide ($Cu_2O$) and bismuth oxide ($Bi_2O_3$) are within the ranges of 5 to 95 mol% and 95 to 5 mol%, respectively. Particularly, the very small values are seen at 20 mol% of $Cu_2O$ and 80 mol% of $Bi_2O$— 4.1% at $-25°$ C. and $-4.8\%$ at $+85°$ C.

As reviewed above, it is possible to obtain semiconductive ceramic products with minimized variations in characteristics and a rate of change of dielectric constant with temperature which is greatly reduced by not merely diffusing such material as bismuth oxide ($Bi_2O_3$) or copper oxide ($Cu_2O$) singly in the grain boundaries in the semiconductive ceramics mainly composed of strontium titanate ($SrTiO_3$) and containing at least 0.1 to 2 mol% of a material or materials such as niobium oxide ($Nb_2O_5$) necessary for formation of the semiconductor, but by applying and diffusing both bismuth oxide and copper oxide in the form of a composition consisting of 5 to 95 mol% and 95 to 5 mol%, respectively, as proposed in this invention. This achievement is of great industrial significance.

It will be apparent that any other known type of electrode material, other than a silver electrode, can also be used in this invention.

It will be also obvious that the gaseous atmosphere used for sintering is not limited to consisting of 1 to 10% hydrogen and 99 to 90% nitrogen as employed in the foregoing example of this invention, but any other atmosphere capable of rendering the sample well into a semiconductor can be used.

It is also possible to use tantalum oxide ($Ta_2O_5$) instead of niobium oxide ($Nb_2O_5$) which was used in the instant embodiment for the purpose of formation of the semiconductor. The results of experiments show that there is not much difference in the use of these two materials except that in the case of using tantalum oxide ($Ta_2O_5$), the loading thereof may be slightly reduced as it is less evaporatable than niobium oxide ($Nb_2O_5$).

EXAMPLE 1

Strontium titanate ($SrTiO_3$) is added to niobium oxide ($Nb_2O_5$) in an amount of 0.1 to 2.0 mol%, and after sufficient mixing, the mixture is pressure molded into a disc with a size of 15 mm in diameter and 0.7 mm in thickness. This disc is sintered in an atmosphere composed of 1 to 10% hydrogen and 99 to 90% nitrogen at 1370° to 1460° C. for 2 to 4 hours, and then a blend of diffusion materials is spread on one side of the sintered disc by using a suitable known binder (such as polyvinyl alcohol), followed by a heat treatment at 1050° to 1200° C. for about 2 hours. A silver electrode is provided on both sides of the thus obtained sintered disc.

Table 2 shows the mean values of the electrical properties of 20 samples of ceramic products obtained by applying and diffusing mixtures of copper oxide ($Cu_2O$) and maganese dioxide ($MnO_2$) of various compositions in the sintered disc.

Table

| Diffused materials (mol. ratio) | | Effective dielectric constant $\epsilon$ | Dielectric loss tan $\delta$ (%) | Insulating resistance ($\Omega$-cm) |
|---|---|---|---|---|
| $Cu_2O$ | $MnO_2$ | | | |
| 1.0 | 0 | 19573 | 1.20 | $5.1 \times 10^9$ |
| 0.95 | 0.05 | 24431 | 0.82 | $4.5 \times 10^{10}$ |
| 0.80 | 0.20 | 28867 | 1.27 | $6.1 \times 10^{10}$ |
| 0.50 | 0.50 | 35848 | 1.32 | $1.9 \times 10^{10}$ |
| 0.20 | 0.80 | 37651 | 2.47 | $1.3 \times 10^{10}$ |
| 0.05 | 0.95 | 41289 | 3.64 | $9.5 \times 10^9$ |
| 0 | 1.0 | 44472 | 1.96 | $8.6 \times 10^9$ |

Figure 4A:
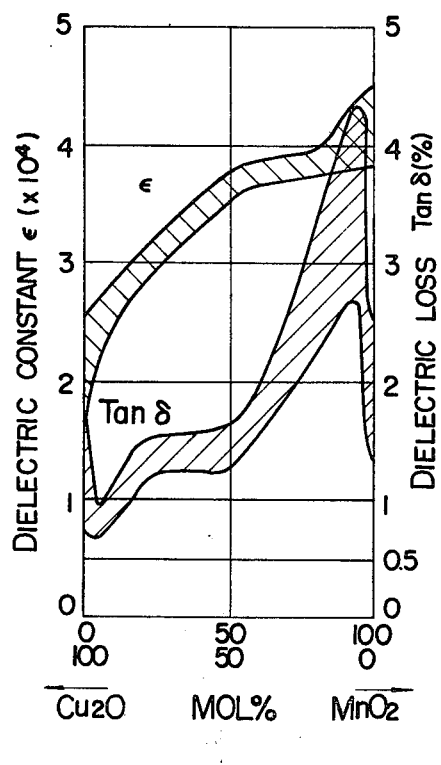

Figs. 4(A) and (B) are diagrammatic representations of the characteristic properties of these samples. The property values of all of the samples are covered within the hatched areas in the drawings. The curve defining the upper limit of each area indicates the maximum values of the respective samples and the curve defining the lower limit of each area indicates the minimum values of the respective samples.

Figure 5A:
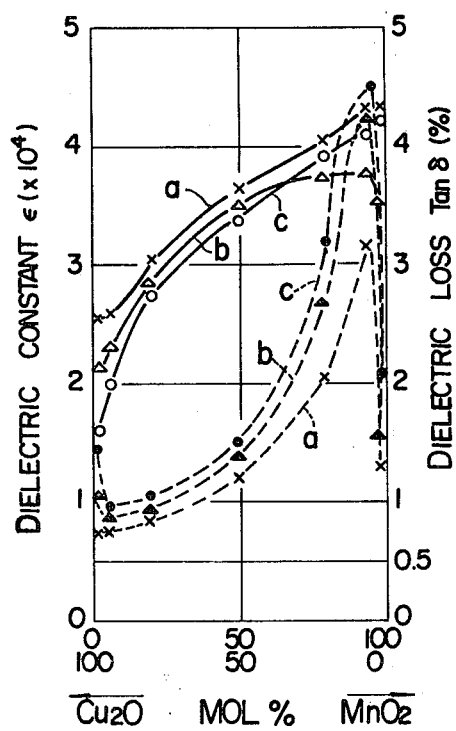
Figure 5B:
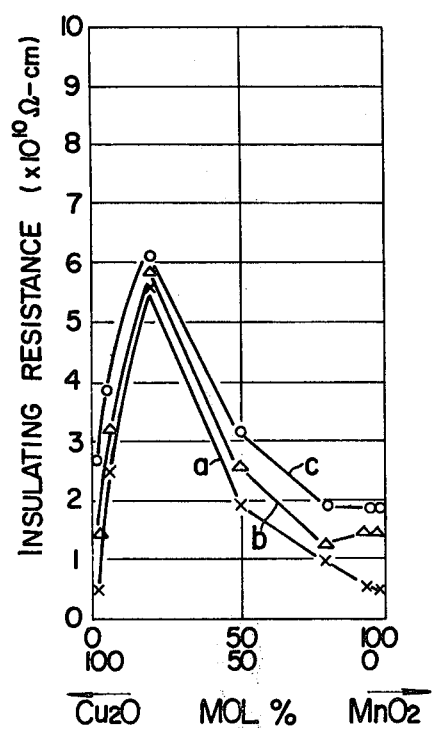

As apparent from these table and drawings, greater improvement of properties of the respective samples is seen when both copper oxide ($Cu_2O$) and manganese dioxide ($MnO_2$) are diffused in combination than when such material is used singly. FIG. 5(A) and (B) show the property values of the respective samples as obtained when applying the mixture of diffusion materials at the rates of 0.3 mg/cm$^2$, 0.5 mg/cm$^2$ and 1.0 mg/cm$^2$. In the drawings, a, b and c indicate the characteristic curves for the respective rates of application. As noted from these drawings, the influence of the loading of diffused composition to the product properties is less when both copper oxide ($Cu_2O$) and manganese dioxide ($MnO_2$) are used in combination within the ranges of 50 to 95 mol% and 5 to 50 mol%, respectively, than when such material is diffused singly.

Figure 4B:
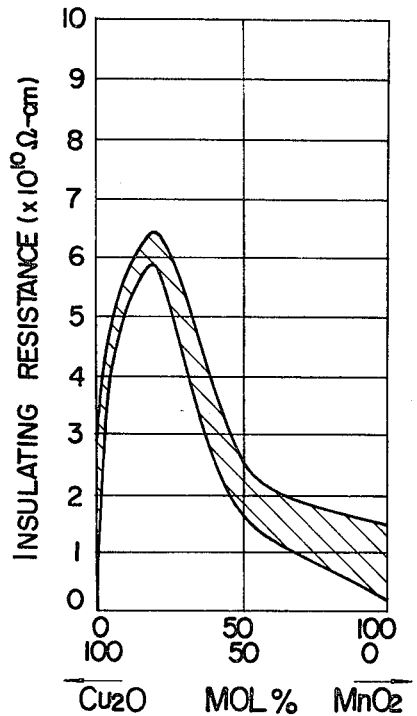

It is also evident from FIGS. 5(A) and (B) that variations of properties seen in FIG. 4 are due to the difference in loading of the diffused composition.

Figure 6:
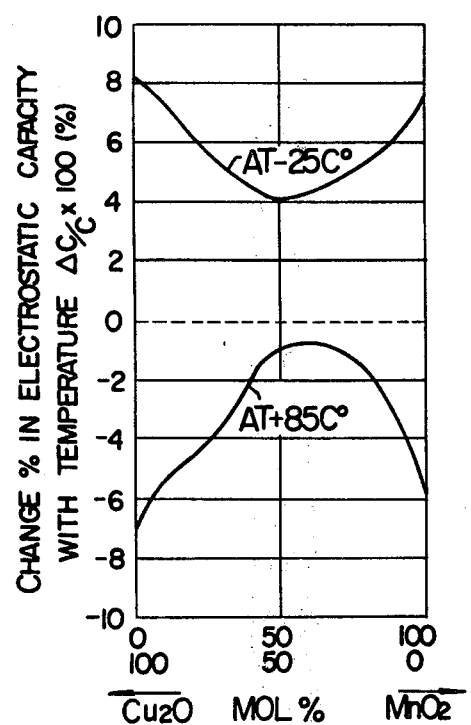

FIG. 6 shows the rates of change of dielectric constant at the temperatures of −25° C. and +85° C. It is noticed from this figure that the temperature dependency of electrostatic capacity is very low when the proportions of copper oxide ($Cu_2O$) and manganese dioxide ($MnO_2$) are within the ranges of 5 to 95 mol% and 95 to 5 mol%, respectively. Particularly, the rate of change of dielectric constant was excessively low (4.0% at −25° C. and −0.92% at +85° C.) when the proportions of $Cu_2O$ and $MnO_2$ were both 50 mol%.

It is thus possible to obtain excellent semiconductive ceramic products with a reduced rate of change of electrostatic capacity with temperature and minimized quality scatter (to a degree never attainable with the conventional methods) by not simply diffusing such material a copper oxide ($Cu_2O$) or manganese dioxide ($MnO_2$) in grain boundaries in the semiconductive ceramics mainly composed of strontium titanate $SrTiO_3$) and containing at least 0.1 to 2 mol% of niobium oxide ($Nb_2O_5$) necessary for formation of semiconductor, but by diffusing a mixture of copper oxide and manganese dioxide mixed at the proportions of at least 5 to 95 mol% and 95 to 5 mol%, respectively.

EXAMPLE 3

Niobium oxide ($Nb_2O_5$) is added, in an amount within the range of 0.1 to 2.0 mol%, to strontium titanate ($SrTiO_3$) and the mixture, after sufficient mix-up, is pressure molded into a disc with a size of 16 mm in diameter and 0.7 mm in thickness. This disc is sintered in an atmosphere comprising 1 to 10% of hydrogen at 1370 to 1460° C. for 2 to 4 hours, and then a diffusing composition is applied on one side of the sintered disc by using a suitable known binder (such as polyvinyl alcohol), followed by a heat treatment at 1050 to 1200° C. for about 2 hours. A silver electrode is provided on both sides of the thus obtained sintered mass.

Table 3 shows the means values of electrical properties of 20 samples of products obtained by diffusing mixtures of bismuth oxide ($Bi_2O_3$) and manganese dioxide ($MnO_2$) at various proportions in the sintered mass.

Table 3

| Diffused materials (mol. ratio) | | Effective dielectric constant $\epsilon$ | Dielectric loss tan $\delta$ (%) | Insulating resistance ($\Omega$-cm) |
| --- | --- | --- | --- | --- |
| $Bi_2O_3$ | $MnO_2$ | | | |
| 1.0 | 0 | 37010 | 0.93 | $1.6 \times 10^9$ |
| 0.95 | 0.05 | 38760 | 0.51 | $6.4 \times 10^{10}$ |
| 0.80 | 0.20 | 38423 | 0.85 | $5.1 \times 10^{10}$ |
| 0.50 | 0.50 | 39700 | 1.56 | $3.4 \times 10^{10}$ |
| 0.20 | 0.80 | 41320 | 2.76 | $1.4 \times 10^{10}$ |
| 0.05 | 0.95 | 42511 | 4.45 | $1.1 \times 10^{10}$ |
| 0 | 1.0 | 44472 | 1.96 | $8.6 \times 10^9$ |

FIG. 7(A) and (B) are diagrammatic representations of the properties of these samples. The property values of all of the samples are embraced within the hatched areas in the drawings. The curve defining the upper limit of each hatched area indicates the maximum values of the samples and the curve defining the lower limit indicates the minimum values of the samples.

Figure 8A:
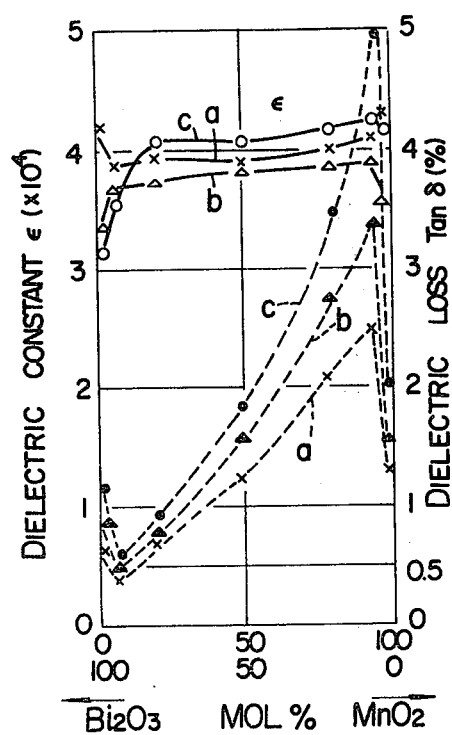
Figure 8B:
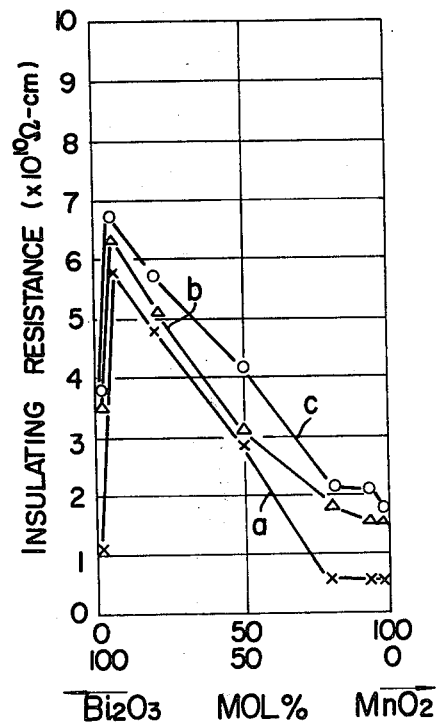

As apparent from table and drawings, there are obtained not only greater improvement of the product properties but also smaller variations thereof when diffusing both bismuth oxide ($Bi_2O_3$) and manganese dioxide ($MnO_2$) in combination as in this invention than when using such material singly. FIGS. 8(A) and (B) show the property values as obtained when loading the diffusing composition at the rates of 0.3 mg/cm², 0.5 mg/cm² and 1.0 mg/cm². In the drawings, a, b and c indicate the characteristic curves corresponding to the respective loadings. As noted from these drawings, the influence of the loading on the product properties is appreciably lessened when diffusing both bismuth oxide and manganese dioxide in combination at the proportions of 5 to 50 mol% and 95 to 50 mol%, respectively, as compared with the case of diffusing these material singly. It is also evident from FIG. 8 that property variations in FIG. 7 resulted from the difference of loading.

Figure 9:
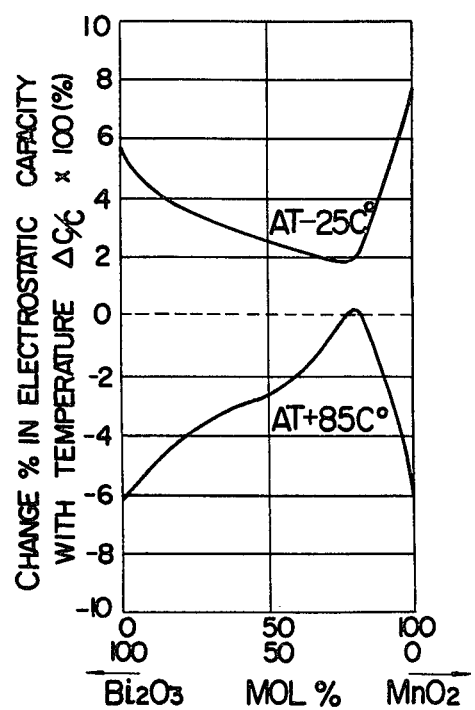

FIG. 9 shows the rates of changes of electrostatic capacity at the temperatures of -25° C. and +85° C. It is noted from this drawing that the rate of change is very low when the proportions of bismuth oxide ($Bi_2O_3$) and manganese dioxide ($MnO_2$) are within the ranges of 5 to 95 mol% and 95 to 5 mol%, respectively. Particularly, the rate of change becomes smallest (+1.8% at −25° C. and +0.3% at +85° C.) when the proportion of $Bi_2O_3$ is 20 mol% and that of $MnO_2$ is 80 mol%.

As will be understood from the foregoing description, it is possible to obtain excellent semiconductor ceramic products with reduced property variations and minimized rate of change of electrostatic capacity with temperature, not by merely diffusing such material as bismuth oxide ($Bi_2O_3$) or manganese dioxide ($MnO_2$) singly in the grain boundaries in the semiconductive ceramics mainly composed of strontium titanate ($SrTiO_3$) and containing at least 0.1 to 2 mol% of niobium oxide ($Nb_2O_5$) necessary for formation of a semiconductor, but by diffusing a composition of these materials, $Bi_2O_3$ and $MnO_2$, mixed at the proportions of 5 to 95 mol % and 95 to 5 mol%, respectively. The industrial significance of this achievement will be apparent.

EXAMPLE 4

Strontium titanate ($SrTiO_3$) is added with 0.1 to 2 mol% of bismuth oxide ($Bi_2O_3$) and 0.1 to 2 mol% of niobium oxide ($Nb_2O_5$), and after mixing these materials well, the mixture is pressure molded into a disc with a size of 15 mm in diameter and 0.7 mm in thickness. This disc is sintered in an atmosphere comprising 1 to 10% of hydrogen and 99 to 90% of nitrogen at 1370 to 1460° C. for 2 to 4 hours, and then a diffusing composition is applied on one side of the sintered disc by using a suitable known binder (such as polyvinyl alcohol), followed by a heat treatment at 1050 to 1200° C. for about 2 hours. A silver electrode is provided on both sides of the thus obtained sintered mass.

Table 4 shows the mean values of electrical properties of 20 samples of products obtained by diffusing mixtures of bismuth oxide ($Bi_2O_3$) and copper oxide ($Cu_2O$) at various proportions in the sintered mass.

Table 4

| Diffused materials (mole ratio) | | Effective dielectric constant $\epsilon$ | Dielectric loss tan $\delta$ (%) | Insulating resistance ($\Omega$-cm) |
| --- | --- | --- | --- | --- |
| $Cu_2O$ | $Bi_2O_3$ | | | |
| 1.0 | 0 | 43382 | 0.60 | $1.2 \times 10^{10}$ |
| 0.9 | 0.1 | 43461 | 0.49 | $2.1 \times 10^{10}$ |
| 0.8 | 0.2 | 43302 | 0.51 | $2.5 \times 10^{10}$ |
| 0.5 | 0.5 | 43502 | 0.45 | $3.9 \times 10^{10}$ |
| 0.2 | 0.8 | 42914 | 0.35 | $7.5 \times 10^{10}$ |
| 0.1 | 0.9 | 43112 | 0.30 | $2.2 \times 10^{10}$ |
| 0 | 1.0 | 43181 | 0.40 | $0.8 \times 10^{10}$ |

Figure 10A:
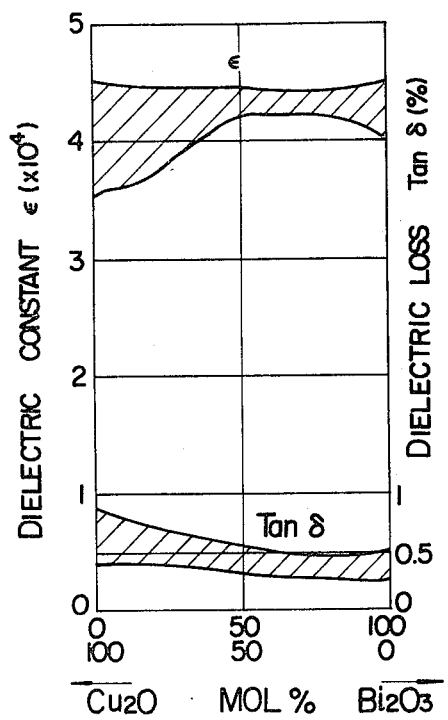

FIGS. 10(A) and (B) are diagrammatic representations of the above properties of the samples. The property values of all of the samples are included within the hatched areas in the drawings, and the curve defining the upper limit of each hatched area indicates the maximum values and the curve defining the lower limit indicates the minimum values.

Figure 10B:
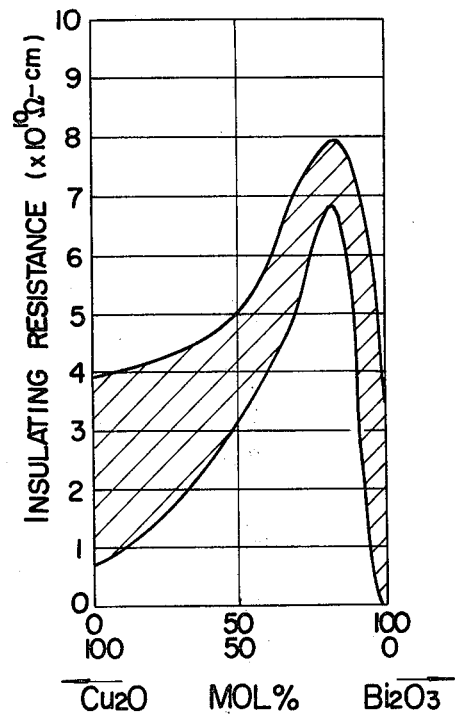
Figure 11A:
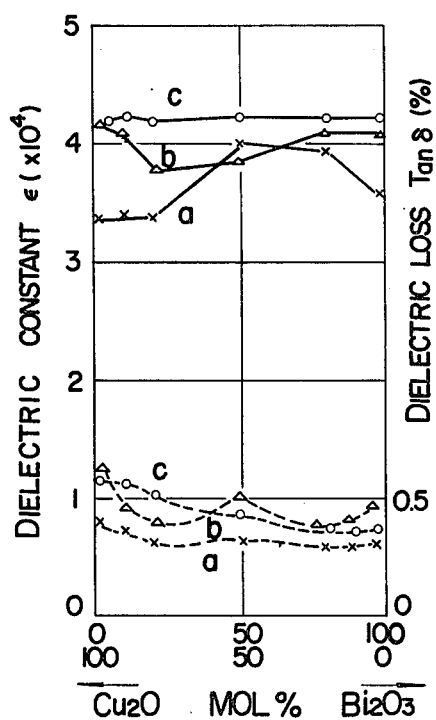
Figure 11B:
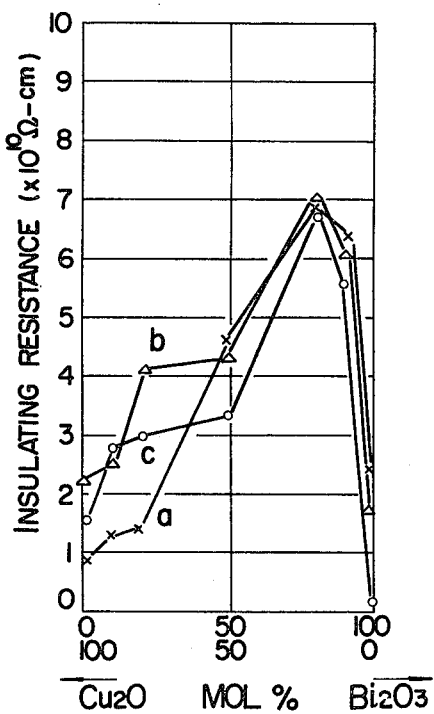

As apparent from these table and drawings, use of a combination of copper oxide ($Cu_2O$) and bismuth oxide ($Bi_2O_3$) for diffusion results in not only greater improvement of various product properties but also smaller quality variations than when using either of these materials singly. FIG. 11 shows the property values obtained by loading the diffusion composition at the rates of 0.3 mg/cm$^2$, 0.5 mg/cm$^2$ and 1.0 mg/cm$^2$, respectively. In the drawings, curves a, b and c are characteristic curves representing the respective loadings. As noted from these drawings, the influence of the loading to electrical properties is smaller when copper oxide ($Cu_2O$) and bismuth oxide ($Bi_2O_3$) are used in combination than when either of these materials is used singly. It is also evident from these drawings that the difference of loading is responsible for property variations seen in FIG. 10.

Figure 12:
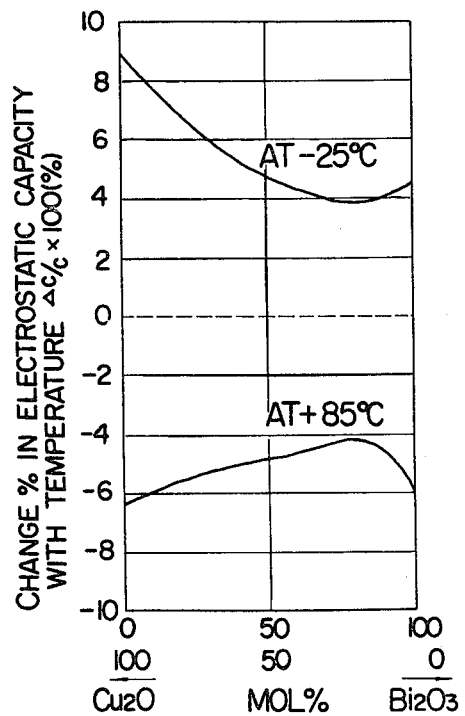

FIG. 12 shows the rates of change of electrostatic capacity at −25° C. and +85° C. (with the value at 20° C. being given as a reference standard). It will be noted from this drawing that temperature dependency of dielectric constant is very small when the proportions of copper oxide ($Cu_2O$) and bismuth oxide ($Bi_2O_3$) are within the ranges of 5 to 95 mol% and 95 to 5 mol%, respectively. The smallest temperature dependency (3.8% at −25° C. and "4.3% at +85° C.) is provided when the proportion of $Cu_2O$ is 20 mol% and that of $Bi_2O_3$ is 80 mol%.

Addition of bismuth oxide ($Bi_2O_3$) to strontium titanate ($SrTiO_3$) proves to be helpful to promote growth of the microcrystal grains in the sintered mass and to make distribution of such grains uniform, resulting in even more restricted property variations and, particularly, further improvement of the effective dielectric constant. Table 5 below shows comparatively the differences in product properties obtained when niobium oxide ($Nb_2O_5$) alone is first added to strontium titanate ($SrTiO_3$) and when both niobium oxide ($Nb_2O_5$) and bismuth oxide ($Bi_2O_3$) are first added to strontium titanate. In the table, sample A is a product obtained by adding niobium oxide ($Nb_2O_5$) alone in an amount of 1 mol% to strontium titanate, sintering the mixture at 1400° C. to form a sintered mass, and then diffusing a composition of bismuth oxide ($Bi_2O_3$) and copper oxide ($Cu_2O$) blended in the ratio of 80 to 20 mol% in the sintered mass, and sample B is a product obtained by adding both niobium oxide ($Nb_2O_5$) and bismuth oxide ($Bi_2O_3$), in amounts of 0.1 mol% and 1.5 mol%, respectively, to strontium titanate ($SrTiO_3$) and then subjecting the mixture to the same treatment as in the case of A.

Thus, initial addition of bismuth oxide ($Bi_2O_3$) to strontium titanate ($SrTiO_3$) brings about an enhanced effect of the present invention.

Table 5

| Properties Sample | Average crystal size (μ) | Effective dielectric constant ε | Dielectric loss tan δ (%) | Insulating resistance (Ω-cm) |
|---|---|---|---|---|
| A | 25 | 33018 | 0.41 | 7.6 × 10$^{10}$ |
| B | 40 | 43120 | 0.35 | 7.5 × 10$^{10}$ |

As appreciated from the foregoing discussion, it is possible to obtain excellent semiconductive ceramic products with product variations that are smaller than any attainable in the prior art and also with a reduced rate of change of dielectric constant with temperature, not by merely diffusing such material as bismuth oxide or copper oxide singly in the grain boundaries in the semiconductor ceramics mainly composed of strontium titanate and containing at least 0.1 to 2 mol% of niobium oxide necessary for formation of the semiconductor and further containing at least 0.1 to 2 mol% of bismuth oxide, but by diffusing both bismuth oxide and copper oxide in the form of a composition blended at the proportions of at least 5 to 95 mol% and 95 to 5 mol%, respectively.

EXAMPLE 5

Bismuth oxide ($Bi_2O_3$) and niobium oxide ($Nb_2O_5$) are added, in amounts of 0.1 to 5.0 mol% and 0.1 to 2 mol%, respectively, to strontium titanate ($SrTiO_3$) and after sufficient mixing, the mixture is pressure molded into a disc with a size of 15 mm in diameter and 0.7 mm in thickness. This disc is sintered in an atmosphere consisting of 1 to 10% of hydrogen and 99 to 90% of nitrogen at 1370 to 1460° C. for 2 to 4 hours, and then a diffusing composition is applied on one side of the sintered disc by using a suitable known binder (such as polyvinyl alcohol), followed by a heat treatment at 1050 to 1200° C. for about 2 hours. A silver electrode is provided on both sides of the thus obtained sintered dics.

Table 6 shows the mean values of electrical properties of 20 samples of products obtained by diffusing mixtures of bismuth oxide ($Bi_2O_3$) and manganese dioxide ($MnO_2$) of various proportions.

Table 6

| Diffused materials (mole ratio) | | Effective dielectric constant ε | Dielectric loss tan δ (%) | Insulating resistance (Ω-cm) |
|---|---|---|---|---|
| $Bi_2O_3$ | $MnO_2$ | | | |
| 1.0 | 0 | 43181 | 0.40 | 0.8 × 10$^{10}$ |
| 0.95 | 0.05 | 43696 | 0.38 | 3.6 × 10$^{10}$ |
| 0.90 | 0.10 | 43537 | 0.51 | 6.8 × 10$^{10}$ |
| 0.85 | 0.15 | 44083 | 0.64 | 6.4 × 10$^{10}$ |
| 0.80 | 0.20 | 45817 | 0.99 | 5.6 × 10$^{10}$ |
| 0.50 | 0.50 | 45777 | 1.73 | 5.0 × 10$^{10}$ |
| 0.20 | 0.80 | 46932 | 3.59 | 3.2 × 10$^{10}$ |
| 0.10 | 0.90 | 45431 | 5.94 | 1.3 × 10$^{10}$ |
| 0 | 1.0 | 45619 | 2.49 | 0.15 × 10$^{10}$ |

Figure 13A:
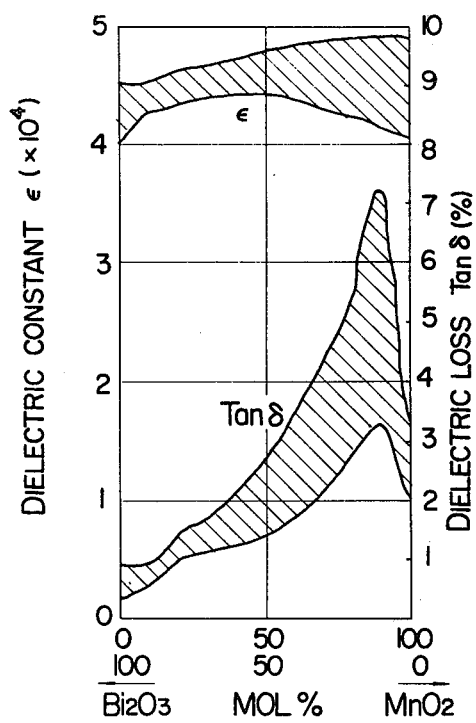

FIGS. 13(A) and (B) are graphical representations of the properties of these samples. The property values of all of the samples are comprised within the shadowed areas in the drawings. The curve defining the upper limit of each shadowed area indicates the maximum property values of the samples and the curve defining the lower limit of each area indicates the minimum property values.

Figure 13B:
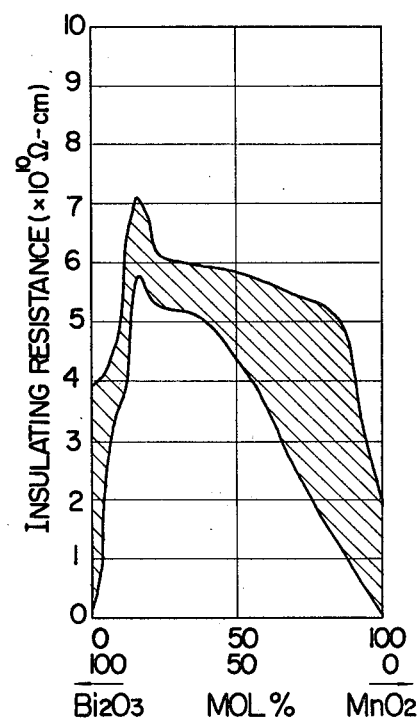
Figure 14A:
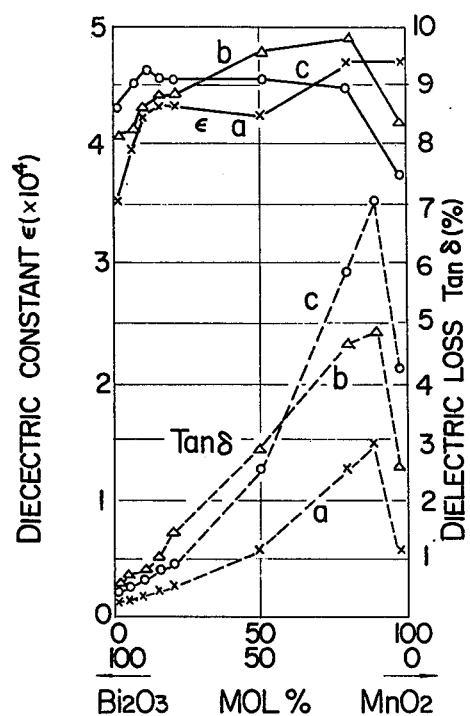
Figure 14B:
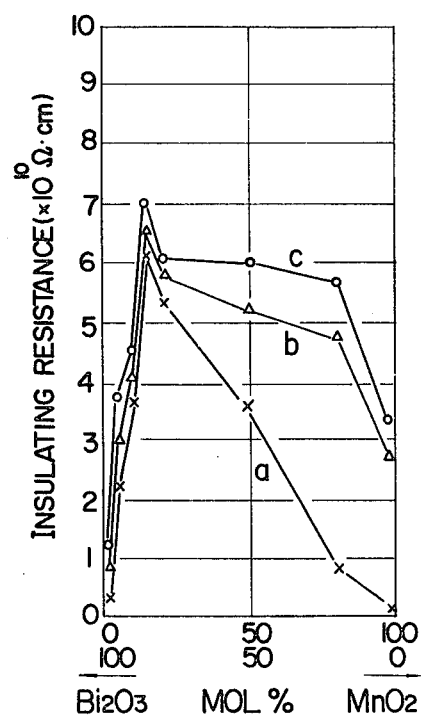

As apparent from these table and drawings, greater improvement of properties and smaller range of variations are obtained with both bismuth oxide ($Bi_2O_3$) and manganese dioxide ($MnO_2$) are diffused by combining them at the proportions of 50 to 95 mol% and 50 to 5 mol%, respectively, than when either of such materials is used singly. FIGS. 14(A) and (B) show the property values obtained when the diffusing composition is loaded at the rates of 0.3 mg/cm$^2$, 0.5 mg/cm$^2$ and 1.0 mg/cm$^2$. In the drawings, a, b and c indicate the characteristic curves representing the respective loadings. It is noted from these drawings that the influence of loading on electrical properties is smaller when copper oxide and manganese dioxide are used in combination than when one of such materials is used singly. It is also evident from these drawings that variations of properties noted in FIG. 13 are mostly ascribed to the difference of loading.

Figure 15:
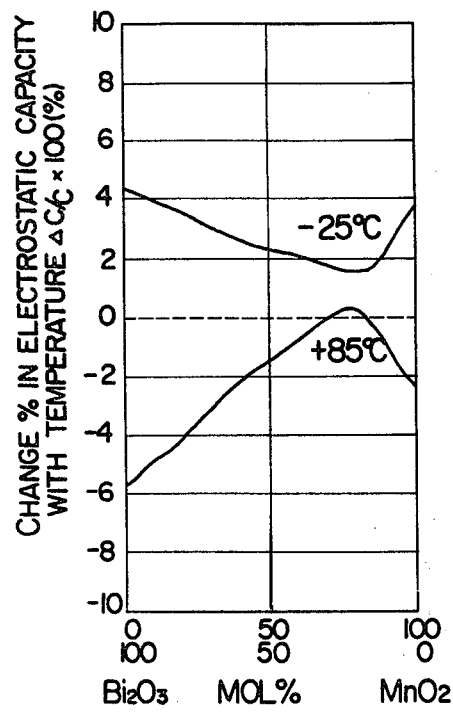

FIG. 15 shows the rates of change of electrostatic capacity at the temperatures of −25° C. and +85° C. It is learned from this drawing that the temperature dependency of the dielectric constant is very low when the proportion of bismuth oxide ($Bi_2O_3$) is within the range of 5 to 95 mol% and that of manganese dioxide ($MnO_2$) is within the range of 95 to 5 mol%. It is also noted that such temperature dependency is lowest (+1.6% at −25° C. and +0.3% at +85° C.) when the proportion of $Bi_2O_3$ is 20 mol% and that of $MnO_2$ is 80 mol%.

The fact is also seen that addition of bismuth oxide ($Bi_2O_3$) to strontium titanate ($SrTiO_3$) helps to promote growth of the microcrystal grains in the sintered mass and to uniformly distribution of such grains, resulting in even more restricted property variations and greater improvement of the effective dielectric constant. Table 7 below shows comparatively the differences in properties as observed when niobium oxide ($Nb_2O_5$) alone is added initially to strontium titanate and when both niobium oxide ($Nb_2O_5$) and bismuth oxide ($Bi_2O_3$) are initially added to strontium titanate. In the table, sample A is a product obtained by adding 1 mol% of niobium oxide to strontium titanate, sintering the mixture at 1400° C. and then diffusing a composition consisting of 85 mol% of bismuth oxide ($Bi_2O_3$) and 15 mol% of manganese dioxide ($MnO_2$) in the sintered mass, and sample B is a product obtained by adding both niobium oxide ($Nb_2O_5$) and bismuth oxide ($Bi_2O_3$) (1.5 mol%) to strontium titanate and then subjecting the mixture to the same treatment as in the case of A.

Table 7

| Sample | Average crystal grain size (μ) | Effective dielectric constant ε | Dielectric loss tan δ (%) | Insulating resistance (Ω-cm) |
|---|---|---|---|---|
| A | 25 | 35729 | 0.80 | $5.1 \times 10^{10}$ |
| B | 40 | 44083 | 0.64 | $6.4 \times 10^{10}$ |

As apparent from the above table, initial addition of both bismuth oxide ($Bi_2O_3$) and niobium oxide ($Nb_2O_5$) to strontium titanate ($SrTiO_3$) leads to an even higher effect of the present invention.

As discussed above, it is possible to obtain excellent semiconductive ceramic elements which have such small property variations that they would never be expected from conventional products and also a minimum rate of change of electrostatic capacity with temperature, not by merely diffusing such material as bismuth oxide ($Bi_2O_3$) or manganese dioxide ($MnO_2$) singly in the grain boundaries in the semiconductor ceramics mainly composed of strontium titanate and also containing at least 0.1 to 2 mol% of niobium oxide ($Nb_2O_5$) (which is necessary for formation of semiconductor) as well as at least 0.1 to 5.0 mol% of bismuth oxide ($Bi_2O_3$), but by diffusing a composition of bismuth oxide and manganese dioxide blended at the proportions of at least 50 to 95 mol% and 50 to 5 mol%, respectively. This achievement is of great industrial significance.

EXAMPLE 6

Strontium titanate is added to 0.1 to 2 mol% of bismuth oxide and 0.1 to 2 mol% of niobium oxide and the mixture, after sufficient mixing, is pressure molded into a disc with a size of 15 mm in diameter and 0.7 mm in thickness. This disc is sintered in an atmosphere of 1 to 10% hydrogen and 99 to 90% nitrogen at 1370 to 1460° C. for 2 to 4 hours, and then a diffusing composition is applied on one side of the sintered disc by using a suitable known binder (such as polyvinyl alcohol), followed by a heat treatment at 1050° to 1200° C. for about 2 hours. A silver electrode is provided on both sides of the thus obtained sintered disc.

Table 8 shows the average values of electrical properties of 20 samples of products obtained by diffusing mixtures of copper oxide ($Cu_2O$) and manganese dioxide ($MnO_2$) of various proportions.

Table 8

| Diffused materials (molar ratio) | | Effective dielectric constant ε | Dielectric loss tan δ (%) | Insulating resistance (Ω-cm) |
|---|---|---|---|---|
| $Cu_2O$ | $MnO_2$ | | | |
| 1.0 | 0 | 43382 | 0.60 | $1.2 \times 10^{10}$ |
| 0.95 | 0.05 | 43193 | 0.60 | $4.7 \times 10^{10}$ |
| 0.9 | 0.1 | 42948 | 0.64 | $5.2 \times 10^{10}$ |
| 0.8 | 0.2 | 43173 | 0.82 | $2.1 \times 10^{10}$ |
| 0.5 | 0.5 | 45097 | 2.13 | $1.7 \times 10^{10}$ |
| 0.2 | 0.8 | 46903 | 4.64 | $1.1 \times 10^{10}$ |
| 0.1 | 0.9 | 47289 | 6.25 | $0.9 \times 10^{10}$ |
| 0 | 1.0 | 45619 | 2.49 | $0.15 \times 10^{10}$ |

Figure 16A:
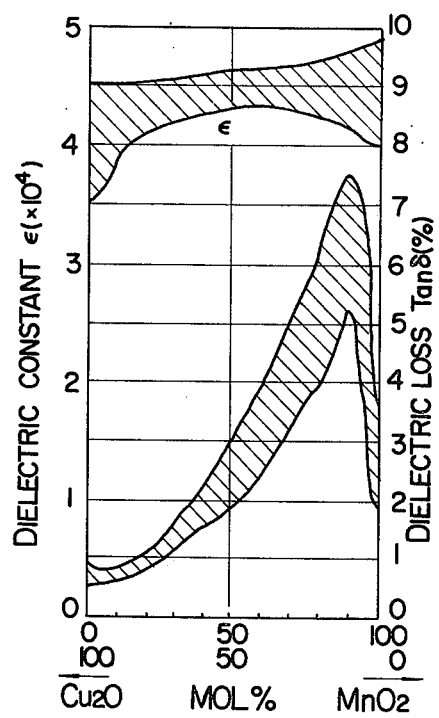

FIG. 16(A) and (B) are graphic representations of the properties of these samples. The property values of all of the samples are included within the shadowed areas in the drawings. The curve defining the upper limit of each shadowed area indicates the maximum property values of the samples and the curve defining the lower limit of each area indicates the minimum property values.

Figure 16B:
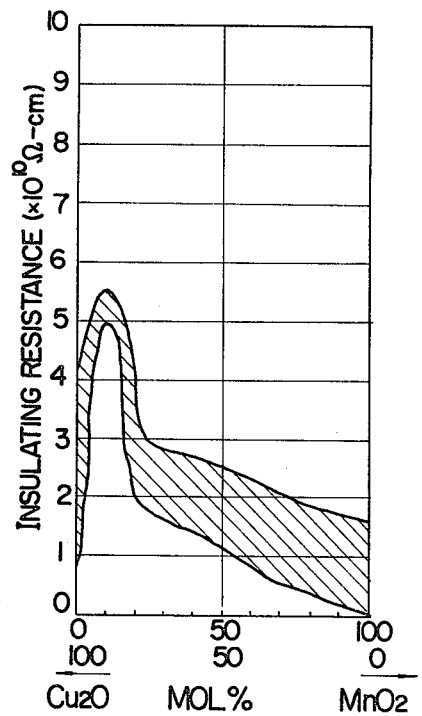
Figure 17A:
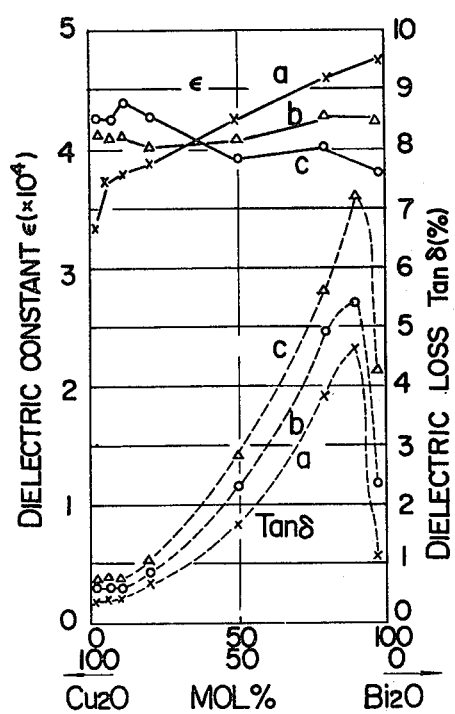
Figure 17B:
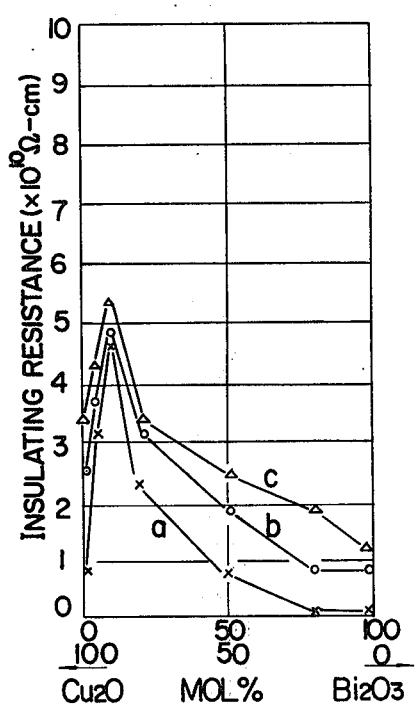

As apparent from these table and drawings, greater improvement of properties and smaller range of property variance are obtained when both copper oxide and manganese dioxide are diffused in combination at the compositional proportions of 50 to 95 mol% and 50 to 5 mol%, respectively, than when either of such materials is used singly. FIGS. 17(A) and (B) show the property values obtained when the diffusing composition is loaded at the rates of 0.3 mg/cm$^2$, 0.5 mg/cm$^2$ and 1.0 mg/cm$^2$. In the drawings, curves a, b and c are characteristic curves corresponding to the respective loadings. As apparent from these drawings, the influence of loading to the electrical properties is smaller when both copper oxide and manganese dioxide are used in combination than when either of such materials is applied singly. It is also evident from these drawings that the difference in loading is mostly responsible for variations of properties seen in FIG. 16.

Figure 18:
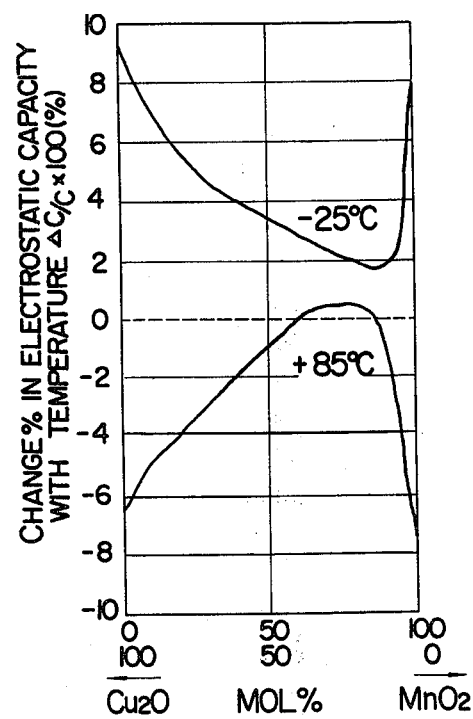

FIG. 18 shows the rates of change of electrostatic capacity at the temperatures of −25° C. and +85° C. (with the value at 20° C. being given as reference standard). It is noted from this drawing that temperature dependency of dielectric constant is very low when the blended proportions of copper oxide and manganese dioxide are within the ranges of 5 to 95 mol% and 95 to 5 mol%, respectively. Particularly, such temperature dependency is lowest (+2.0% at −25° C. and +0.4% at +85° C.) when the proportion of $Cu_2O$ is 20 mol% and that of $MnO_2$ is 80 mol%.

It is also noted that addition of bismuth oxide to strontium titanate promotes growth and uniformalization of the microcrystal grains in the sintered mass, resulting in even smaller scatter of properties and greater improvement of effective dielectric constant. Table 9 below shows comparatively the differences in properties when niobium oxide alone is initially added to strontium titanate and when both niobium oxide and bismuth oxide are initially added to strontium titanate. In the table, sample A represents the case where niobium oxide (Nb$_2$O$_5$) alone is added in an amount of 1 mol% to strontium titanate (SrTiO$_3$) and after sintering the mixture at 1400° C., a composition comprising 90 mol% of copper oxide (Cu$_2$O) and 10 mol% of manganese dioxide (MnO$_2$) is diffused in the sintered mass, and trode is provided on both sides of the thus obtained sintered mass.

Table 10 below shows the electrical properties of 20 samples of products obtained by diffusing mixtures of copper oxide (Cu$_2$O), bismuth oxide (Bi$_2$O$_3$) and manganese dioxide (MnO$_2$) of various proportions in the sintered mass.

Table 10

| Oxide composition (mol ratio) in diffusing agent | | | Mean values properties of sample | | | (Standard deviation)/ Composition | | | |
|---|---|---|---|---|---|---|---|---|---|
| | | | Dielectric constant E | Dielectric loss tan δ | Insulating resistance (mean value) D | | | | |
| Cu$_2$O | Bi$_2$O$_3$ | MnO$_2$ | (×10$^4$) | (%) | R(× 10$^9$ Ωcm) | De$_E$ (%) | D$_{tan\,δ}$ (%) | D$_r$ (%) | No. |
| 100 | 0 | 0 | 3.96 | 1.20 | 5.1 | 20 | 42 | 41 | 1 |
| 0 | 100 | 0 | 4.70 | 0.98 | 1.6 | 17 | 39 | 50 | 2 |
| 0 | 0 | 100 | 4.45 | 1.96 | 8.6 | 14 | 42 | 40 | 3 |
| 20 | 80 | 0 | 4.30 | 0.41 | 76 | 7 | 29 | 20 | 4 |
| 95 | 0 | 5 | 3.44 | 0.82 | 45 | 11 | 28 | 20 | 5 |
| 0 | 95 | 5 | 4.88 | 0.51 | 64 | 8 | 19 | 19 | 6 |
| 19 | 76 | 5 | 4.65 | 0.45 | 88 | 5 | 11 | 11 | 7 |
| 18 | 72 | 10 | 4.31 | 0.66 | 180 | 5 | 6 | 9 | 8 |
| 16 | 64 | 20 | 4.16 | 2.23 | 654 | 8 | 14 | 29 | 9 |
| 10 | 40 | 50 | 4.37 | 4.08 | 44 | 10 | 33 | 17 | 10 |
| 50 | 40 | 10 | 4.28 | 0.56 | 116 | 7 | 9 | 17 | 11 |
| 85 | 5 | 10 | 4.07 | 0.61 | 99 | 7 | 5 | 14 | 12 |
| 5 | 85 | 10 | 4.42 | 0.44 | 125 | 4 | 7 | 12 | 13 | sample B represents the case where both niobium oxide and bismuth oxide (1.5 mol%) are added to strontium titanate and the mixture is subjected to the same treatment as in the case of A.

Table 9

| Sample | Average crystal grain size (μ) | Effective dielectric constant ε | Dielectric loss tan δ (%) | Insulating resistance (Ω-cm) |
|---|---|---|---|---|
| A | 25 | 34180 | 0.81 | 3.7 × 10$^{10}$ |
| B | 40 | 42949 | .64 | 5.2 × 10$^{10}$ |

As apparent from the above table, addition of bismuth oxide (Bi$_2$O$_3$) to strontium titanate (SrTiO$_3$) leads to an even higher effect of the present invention.

As reviewed above, it is possible to obtain excellent ceramic products with very limited quality variations and minimized rate of change of electrostatic capacity with temperature, not by merely diffusing such material as copper oxide (Cu$_2$O) or manganese dioxide (MnO$_2$) singly in the grain boundaries in the semiconductive ceramics mainly composed of strontium titanate and containing at least 0.1 to 2 mol% of niobium oxide (Nb$_2$O$_5$) (which is necessary for formation of semiconductor) and at least 0.1 to 2.0 mol% of bismuth oxide (Bi$_2$O$_3$), but by diffusing both copper oxide and manganese dioxide combined in the form of a composition at the proportions of at least 50 to 95 mol% and 50 to 5 mol%, respectively.

EXAMPLE 7

Strontium titanate is added to 0.1 to 2 mol% of niobium oxide and 0.1 to 5 mol% of bismuth oxide and mixed up well, and then the mixture is pressure molded into a disc with a size of 15 mm in diameter and 0.7 mm in thickness. This disc is sintered in an atmosphere consisting of 1 to 10% of hydrogen and 99 to 90% of nitrogen at 1370 to 1460° C. for 2 to 4 hours, and then a diffusing composition is applied on one side of the sintered disc by using a suitable known binder (such as polyvinyl alcohol), followed by a heat treatment at 1000° to 1200° C. for about 2 hours, and a silver elec- As apparent from this table, in case such material as Cu$_2$O, Bi$_2$O$_3$ or MnO$_2$ is diffused singly as in Composition Nos. 1 to 3, the D values are very large, that is, property variations are large, while insulation resistivity r is small. Composition Nos. 4, 5 and 6 are the best examples of two-component compositions. Use of these components results in smaller property variations and greater r value than those obtained when using a single component. As regards Composition Nos. 7 to 13 representing the three-component compositions, in case the proportion of MnO$_2$ exceeds 20 mol% as in the case of Composition Nos. 9 and 10, the value of tan δ is large and property variations are also somewhat large, but in Composition Nos. 7, 8, 11, 12 and 13, the r value is far greater while property variations are far smaller than in the case of single or two-component compositions.

In general, the characteristics of a capacitor can be expressed by the product of electrostatic capacity C and insulation resistance R. This product of C and R is a constant independent of the capacitor configuration, and if it is expressed by K, the following equation is given:

$$K = C \cdot R = \epsilon\epsilon_o r$$

where $\epsilon_o$ is in vacuo dielectric constant. It is an important condition for an excellent capacitor that this K value is large.

When comparing the K values obtained from use of the respective single-component, two-component and three-component diffusing agents, it is noted that the highest K value obtainable from use of single-component diffusing agents is around 34 (MΩ·μF) and that obtainable from use of two-component agent is about 289 (MΩ·μF), while in the case of three-component agents, particularly in Composition Nos. 7, 8, 11, 12 and 13 in Table 10, even the lowest K value is as high as about 357 and the highest K value reaches about 496.

From these results, the following ranges of blending proportions for Cu$_2$O, Bi$_2$O$_3$ and MnO$_2$ may be determined as optimal: Cu$_2$O : 5–85 mol%; Bi$_2$O$_3$: 5–85 mol%; and MnO$_2$: 5–20 mol%.

FIG. 19 exemplifies the rates of change of electrostatic capacity with temperature in certain products, with 20° C. being given as reference standard in the coordinates. In the graph, curve A shows the rate of change of electrostatic capacity with temperature as observed in a barium titanate type semiconductive capacitor, curve B shows such rate observed in a product obtained by using a $Cu_2O$-$Bi_2O_3$ diffusing composition, and curve C shows the rate observed in a product of this C. for about 2 hours. A silver electrode is provided on both sides of the thus obtained sintered mass.

Table 11 below shows the electrical properties of 20 samples of products obtained by diffusing mixtures of copper oxide ($Cu_2O$), bismuth oxide ($Bi_2O_3$), manganese dioxide ($MnO_2$) and lithium carbonate ($Li_2CO_3$) of various proportions.

Table 11

| Diffused materials (mol ratio) | | | | Mean values of properties | | | (Standard deviation)/ (mean value) D | | | Composition No. |
|---|---|---|---|---|---|---|---|---|---|---|
| $Cu_2O$ | $Bi_2O_3$ | $MnO_2$ | $Li_2CO_3$ | Dielectric constant $\epsilon(\times 10^4)$ | Dielectric loss tan $\delta$ (%) | Insulating resistance $r(\times 10^9 \Omega cm)$ | $D_\epsilon$ | D tan$\delta$ | Dr | |
| 100 | 0 | 0 | 0 | 3.96 | 1.20 | 5.1 | 20 | 42 | 41 | 1 |
| 0 | 100 | 0 | 0 | 4.70 | 0.93 | 1.6 | 17 | 39 | 50 | 2 |
| 0 | 0 | 100 | 0 | 4.45 | 1.96 | 8.6 | 14 | 42 | 40 | 3 |
| 0 | 0 | 0 | 100 | 4.09 | 0.48 | 18 | 16 | 36 | 40 | 4 |
| 20 | 80 | 0 | 0 | 4.30 | 0.41 | 76 | 7 | 29 | 20 | 5 |
| 18 | 72 | 10 | 0 | 4.31 | 0.66 | 130 | 5 | 6 | 9 | 6 |
| 18 | 71 | 6 | 5 | 4.35 | 0.57 | 136 | 5 | 6 | 10 | 7 |
| 17 | 66 | 7 | 10 | 4.34 | 0.55 | 141 | 5 | 5 | 7 | 8 |
| 15 | 59 | 6 | 20 | 4.37 | 0.56 | 177 | 7 | 8 | 10 | 9 |
| 10 | 37 | 3 | 50 | 4.28 | 0.50 | 235 | 4 | 4 | 5 | 10 |
| 4 | 14 | 2 | 80 | 3.17 | 1.31 | 153 | 19 | 34 | 29 | 11 |
| 80 | 5 | 5 | 10 | 4.16 | 0.53 | 142 | 5 | 5 | 8 | 12 |
| 80 | 9 | 1 | 10 | 4.14 | 0.58 | 119 | 6 | 8 | 7 | 13 |
| 70 | 10 | 5 | 15 | 4.28 | 0.65 | 155 | 8 | 7 | 10 | 14 |
| 65 | 10 | 5 | 20 | 4.46 | 0.63 | 147 | 8 | 8 | 11 | 15 |
| 60 | 10 | 5 | 25 | 4.43 | 0.56 | 148 | 5 | 3 | 6 | 16 |
| 40 | 10 | 5 | 45 | 4.33 | 0.52 | 172 | 6 | 3 | 6 | 17 |
| 20 | 10 | 5 | 65 | 4.05 | 1.67 | 196 | 15 | 14 | 18 | 18 |
| 20 | 10 | 10 | 60 | 4.15 | 1.01 | 170 | 18 | 12 | 16 | 19 |
| 20 | 10 | 20 | 50 | 4.53 | 1.17 | 171 | 17 | 23 | 16 | 20 |
| 20 | 10 | 30 | 40 | 4.41 | 2.30 | 74 | 14 | 36 | 25 | 21 |
| 20 | 20 | 20 | 40 | 4.37 | 1.84 | 123 | 18 | 27 | 33 | 22 |
| 3 | 47 | 10 | 40 | 4.64 | 0.68 | 87 | 10 | 8 | 9 | 23 |
| 47 | 3 | 10 | 40 | 3.95 | 0.72 | 74 | 12 | 10 | 17 | 24 |
| 90 | 5 | 1 | 4 | 3.88 | 0.95 | 61 | 14 | 31 | 43 | 25 |
| 5 | 90 | 1 | 4 | 4.61 | 0.75 | 56 | 12 | 26 | 38 | 26 | invention.

As apparent from these graphic representations, the product of this invention using a three-component ($Cu_2O$, $Bi_2O_3$ and $MnO_2$) diffusing composition is smallest in the rate of change of electrostatic capacity with temperature, involving the possibility for expansion of the usable temperature range.

As viewed above, if a ceramic obtained by adding 0.1 to 2.0 mol% of niobium oxide ($Nb_2O_3$) and 0 to 2.0 mol% of bismuth oxide ($Bi_2O_3$) to strontium titanate ($SrTiO_3$) and sintering the mixture is diffused not with merely a material such as copper oxide ($Cu_2O$), bismuth oxide ($Bi_2O_3$) or manganese dioxide ($MnO_2$) singly but with a mixture of these three materials blended at the proportions of 5 to 85 mol% ($Cu_2O$), 5 to 85 mol% ($Bi_2O_3$) and 5 to 20 mol% ($MnO_2$), respectively, so that insulating layers are formed in the grain boundaries, the resultantly obtained product is markedly reduced in variations of property values and also proves to be easy to manufacture. Such product also has excellent properties such as high insulation resistance and minimized rate of change of electrostatic capacity with temperature.

EXAMPLE 8

Strontium titanate is added to 0.1 to 2 mol% of niobium oxide and 0.1 to 5 mol% of bismuth oxide and mixed well, and then the mixture is pressure molded into a disc with size of 15 mm in diameter and 0.7 mm in thickness. This disc is sintered in an atmosphere composed of 1 to 10% hydrogen and 99 to 90% nitrogen at 1370° to 1460° C. for 2 to 4 hours, and then a diffusion composition is applied on one side of the sintered disc by using a suitable known binder (such as polyvinyl alcohol), followed by a heat treatment at 900° to 1200°

As apparent from Table 11, the products obtained by diffusing $Cu_2O$, $Bi_2O_3$, $MnO_2$ or $Li_2CO_3$ singly (Composition Nos. 1 to 4) have very large D values, that is, wide scatter of properties, and are small in insulation resistivity. Composition Nos. 5 and 6 are the best compositions prepared by properly selecting and combining two (Comp. No. 5) and three (Comp. No. 6) of the above-said four kinds of materials. It is noted that use of these compositions leads to certain improvements in both scatter of properties and insulation resistivity as compared with the case of using a one-component diffusing agent. Composition Nos. 7 through 26 show the product properties resulting from use of combinations of all of the four kinds of materials mixed at various proportions. As noticed from the table, the products obtained by using the compositions of Composition Nos. 7, 8, 9, 10, 12, 14, 15, 16 and 17 are very small in D values, and also insulation resistivity of these products is higher than the maximum level obtained from use of the three-component composition (Composition No. 6). This indicates that the products with minimized scatter of properties and high insulation resistivity can be obtained by using the compositions prepared by combining said four kinds of materials particularly in the following ratios: $Cu_2O$, 5 to 85 mol%; $Bi_2O_3$, 5 to 85 mol%; $MnO_2$, 3 to 10 mol%; and $Li_2CO_3$, 5 to 50 mol%.

Comparing the K values of the products obtained by diffusing the one-component, two-component, three-component and four-component compositions respectively, it is noted that the highest K value obtainable from use of one diffusion material is around 34 M$\Omega\cdot\mu$F and that obtainable from use of two-component compositions is around 289 M$\Omega\cdot\mu$F while that obtained from use of three-component compositions is around 496 M$\Omega\cdot\mu$F. In the case of four-component compositions, particularly in Composition Nos. 7, 8, 9, 10, 12, 14, 15, 16 and 17 in Table 11, even the lowest K value is as high as around 524 while the highest K value reaches around 847 MΩ·μF.

FIG. 20 exemplifies the rates of change of electrostatic capacity with temperature in the various products, with the value at 20° C. being given as reference (0) in each case. In the graph, curve A shows the rate of change of electrostatic capacity with temperature seen in a barium titanate type semiconductive capacitor curve B shows that observed in a film (polyester) capacitor, curve C shows that observed in a product obtained by using a three-component ($Cu_2O$, $Bi_2O_3$ and $MnO_2$) diffusion composition discussed in this example, and curve D shows that seen in a product according to this invention.

As apparent from this graph, the product according to this invention has an extremely small rate of change of electrostatic capacity with temperature and therefore has the advantage of allowing expansion of the usable temperature range.

Figure 21:
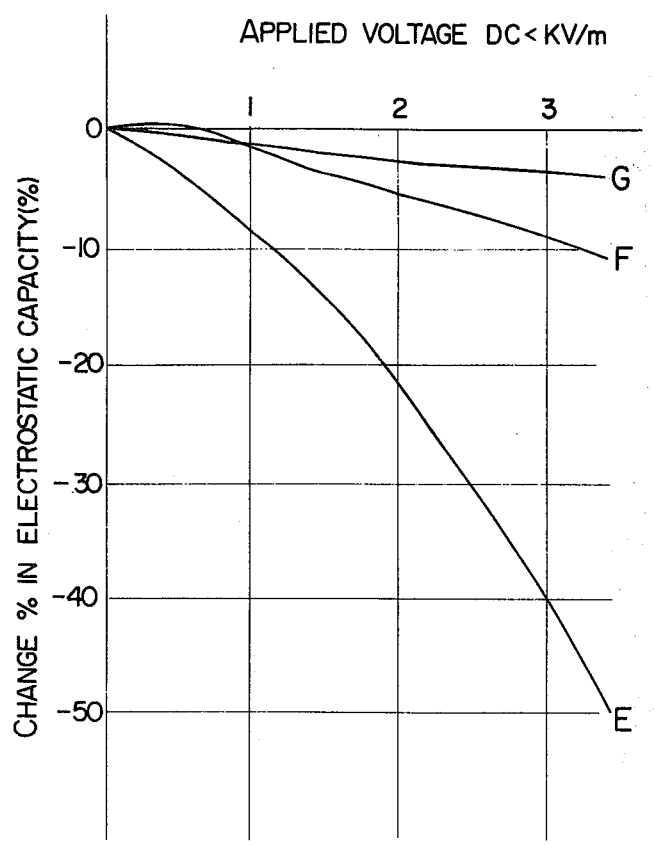
FIG. 21 shows the changes in electrostatic capacity after applying a DC voltage.

FIG. 21 shows the changes (%) in electrostatic capacity after loading of DC voltages. In the graph, curve E shows such change in dielectric capacity witnessed in a barium titanate semiconductive capacitor, curve F shows said change observed in a conventional strontium titanate semiconductive capacitor, and curve G shows the change seen in a product according to this invention.

As apparent from this graph, the product according to this invention, as compared with the conventional semiconductive capacitors, is extremely limited in change in dielectric capacity and strongly resistant to high voltage loading.

As reviewed above, if the ceramics obtained by adding 0.1 to 2.0 mol% of niobium oxide and 0 to 5.0 mol% of bismuth oxide to the main component strontium titanate and sintering the mixture are diffused not with merely such material as copper oxide, bismuth oxide, manganese dioxide or lithium carbonate singly but with a composition of these four materials mixed particularly at the proportions of 5 to 85 mol% ($Cu_2O$), 5 to 85 mol% ($Bi_2O_3$), 3 to 10 mol% ($MnO_2$) and 5 to 50 mol% ($Li_2CO_3$) so as to form insulating layers in the grain boundaries, the resultantly obtained products are greatly lessened in variations of property values as compared with the conventional products and also prove to be easy to manufacture. It is also noted that such products are excellent in various properties, that is, they are high in insulation resistivity, low in rate of change of electrostatic capacity with temperature and small in change in electrostatic capacity by application of DC voltages. It is obvious that this achievement is of great industrial significance.

What is claimed is:

1. Semiconductive ceramics characterized in that a composition comprising at least two of the following materials: copper oxide ($Cu_2O$), bismuth oxide ($Bi_2O_3$), manganese oxide ($MnO_2$) and lithium carbonate ($Li_2CO_3$), is thermally diffused as an insulating layer in the grain boundaries in a polycrystalline ceramic semiconductor mainly composed of strontium titanate ($SrTiO_3$) with small amounts of niobium oxide ($Nb_2O_5$), tantalum oxide ($Ta_2O_5$) or bismuth oxide ($Bi_2O_3$) so that insulating layers are provided in said grain boundaries.

2. Semiconductive ceramics according to claim 1, wherein a composition comprising two materials selected from copper oxide ($Cu_2O$), bismuth oxide ($Bi_2O_3$) and manganese oxide ($MnO_2$) is thermally diffused in the grain boundaries in the polycrystalline ceramic semiconductor composed of 99.9 to 98 mol% of strontium titanate ($SrTiO_3$) and 0.1 to 2 mol% of niobium oxide ($Nb_2O_5$) or tantalum oxide ($Ta_2O_5$) so that the insulating layers are provided in said grain boundaries.

3. Semiconductive ceramics according to claim 2, wherein the composition comprising 5 to 95 mol% of $Bi_2O_3$ and 95 to 5 mol% of $Cu_2O$ is thermally diffused in the grain boundaries in the polycrystalline ceramic semiconductor specified so that the insulating layers are provided in said grain boundaries.

4. Semiconductive ceramics according to claim 2, wherein the composition comprising 50 to 95 mol% of $Cu_2O$ and 50 to 5 mol% of $MnO_2$ is thermally diffused in the grain boundaries in the polycrystalline ceramic semiconductor specified so that the insulating layers are provided in said grain boundaries.

5. Semiconductive ceramics according to claim 2, wherein the composition comprising 5 to 95 mol% of $Bi_2O_3$ and 95 to 5 mol% of $MnO_2$ is thermally diffused in the grain boundaries in the polycrystalline ceramic semiconductor specified so that the insulating layers are provided in said grain boundaries.

6. Semiconductive ceramics according to claim 1, wherein the composition comprising 5 to 95 mol% of $Bi_2O_3$ and 95 to 5 mol% of $Cu_2O$ is thermally diffused in the grain boundaries in the polycrystalline ceramic semiconductor composed of 99.8 to 96 mol% of strontium titanate ($SrTiO_3$), 0.1 to 2 mol% of bismuth oxide ($Bi_2O_3$) and 0.1 to 2 mol% of niobium oxide ($Nb_2O_5$) or tantalum oxide ($Ta_2O_5$) so that the insulating layers are provided in said grain boundaries.

7. Semiconductive ceramics according to claim 1, wherein the composition comprising at least two materials selected from $Bi_2O_3$, $MnO_2$, $Cu_2O$ and $Li_2CO_3$ is thermally diffused in the grain boundaries in the polycrystalline ceramic semiconductor composed of 99.8 to 93 mol% of strontium titanate ($SrTiO_3$), 0.1 to 5 mol% of bismuth oxide ($Bi_2O_3$) and 0.1 to 2 mol% of niobium oxide ($Nb_2O_5$) or tantalum oxide ($Ta_2O_5$) so that the insulating layers are provided in said grain boundaries.

8. Semiconductive ceramics according to claim 7, wherein the composition comprising 50 to 95 mol% of $Bi_2O_3$ and 50 to 5 mol% of $MnO_2$ is thermally diffused in the grain boundaries in the polycrystalline ceramic semiconductor specified so that the insulating layers are provided in said grain boundaries.

9. Semiconductive ceramics according to claim 7, wherein the composition comprising 95 to 50 mol% of $Cu_2O$ and 5 to 50 mol% of $MnO_2$ is thermally diffused in the grain boundaries in the polycrystalline ceramic semiconductor specified so that the insulating layers are provided in said grain boundaries.

10. Semiconductive ceramics according to claim 7, wherein the composition comprising 5 to 85 mol% of $Bi_2O_3$, 5 to 85 mol% of $Cu_2O$ and 5 to 20 mol% of $MnO_2$ is thermally diffused in the grain boundaries in the polycrystalline ceramic semiconductor specified so that the insulating layers are provided in said grain boundaries.

11. Semiconductive ceramics according to claim 7, wherein the composition comprising 5 to 85 mol% of $Cu_2O$, 5 to 85 mol% of $Bi_2O_3$, 3 to 10 mol% of $MnO_2$ and 5 to 50 mol% of $Li_2CO_3$ is thermally diffused in the grain boundaries in the polycrystalline ceramic semiconductor specified so that the insulating layers are provided in said grain boundaries.

* * * * *